United States Patent [19]

Hendrickson

[11] Patent Number: 5,447,123
[45] Date of Patent: Sep. 5, 1995

[54] AQUARIUM EXTENSION ASSEMBLY

[76] Inventor: Robert A. Hendrickson, 4747 NW. 4th Ave., Pompano Beach, Fla. 33064

[21] Appl. No.: 242,880

[22] Filed: May 16, 1994

[51] Int. Cl.⁶ .............................................. A01K 63/00
[52] U.S. Cl. ...................................... 119/249; 119/263
[58] Field of Search ............... 119/249, 250, 247, 248, 119/251, 253, 254, 255, 263

[56] References Cited

U.S. PATENT DOCUMENTS

| | | | |
|---|---|---|---|
| 1,943,417 | 1/1934 | Bringman | 119/249 |
| 5,009,188 | 4/1991 | Yasui | 119/253 |
| 5,230,298 | 7/1993 | Pearce | 119/250 |
| 5,317,991 | 6/1994 | Lee et al. | 119/249 |

FOREIGN PATENT DOCUMENTS

| | | | |
|---|---|---|---|
| 3436170 | 4/1986 | Germany | 119/250 |
| 2095961 | 10/1982 | United Kingdom | 119/249 |

*Primary Examiner*—Todd E. Manahan
*Attorney, Agent, or Firm*—Robert M. Downey

[57] ABSTRACT

An apparatus for use with an existing aquarium tank for extending the aquarium tank includes an extension tank having opposite side walls, a top wall, an open bottom, an interior chamber and a shoulder between the top wall and the bottom wall for supported engagement on the top of the aquarium tank. An exhaust valve assembly includes a one way air valve, a float valve and a valve seat structured and disposed to permit one way passage of air therethrough in response to an external vacuum force, causing air to be drawn from within the interior chamber of extension tank. The apparatus further includes a sealed pump box with an air pump therein to create a vacuum force for drawing air from within the interior chamber and an aeration assembly for replenishing air to the extension tank. The aeration assembly includes an aeration flow valve having a float contained therein being movable between an open condition and a closed condition in response to a change of water level in the aquarium tank; at least one aerator fitted to the extension tank to disperse a flow of air therein; and a flexible conduit connecting between the aerator and flow valve to direct air flow therebetween.

7 Claims, 3 Drawing Sheets

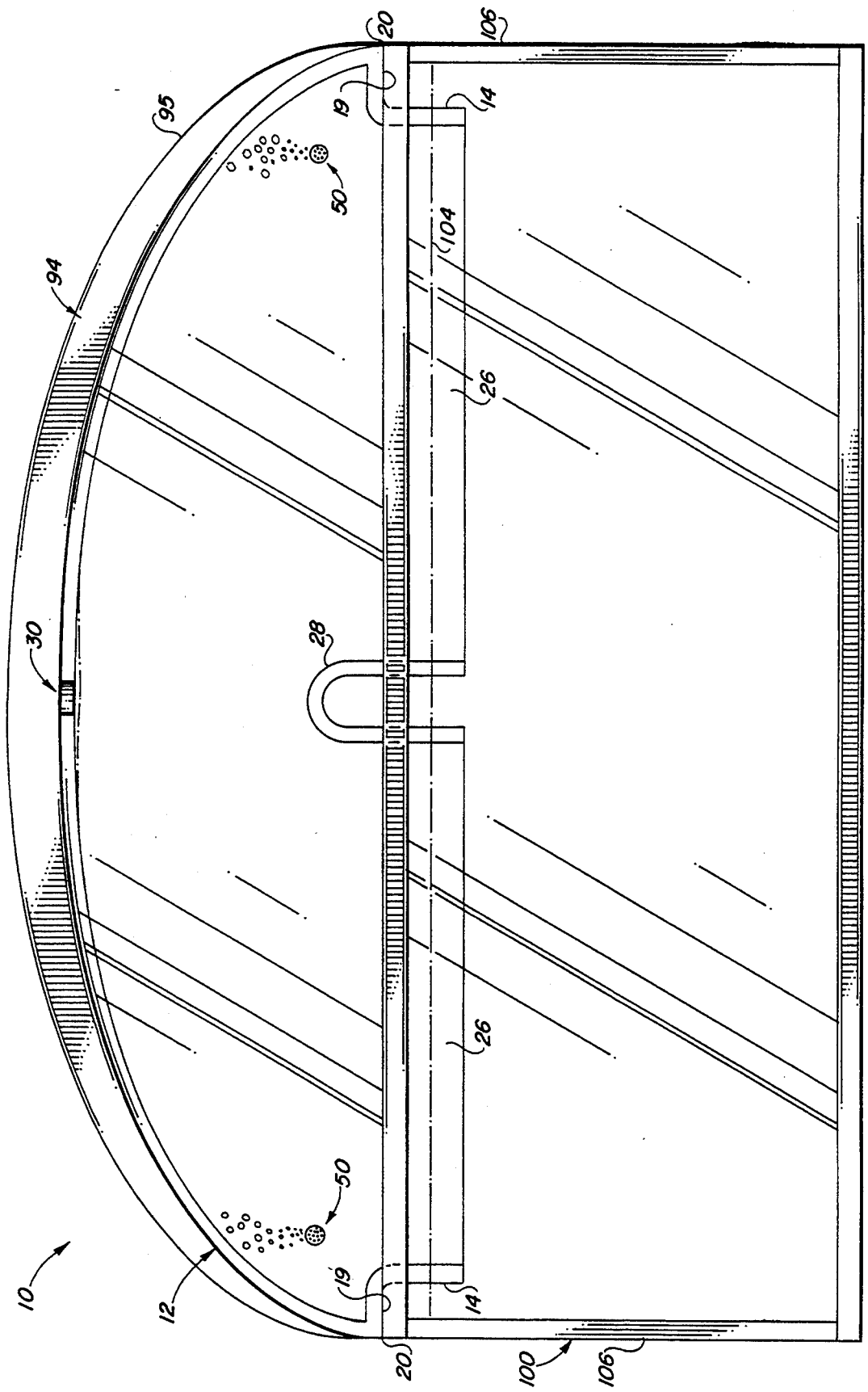

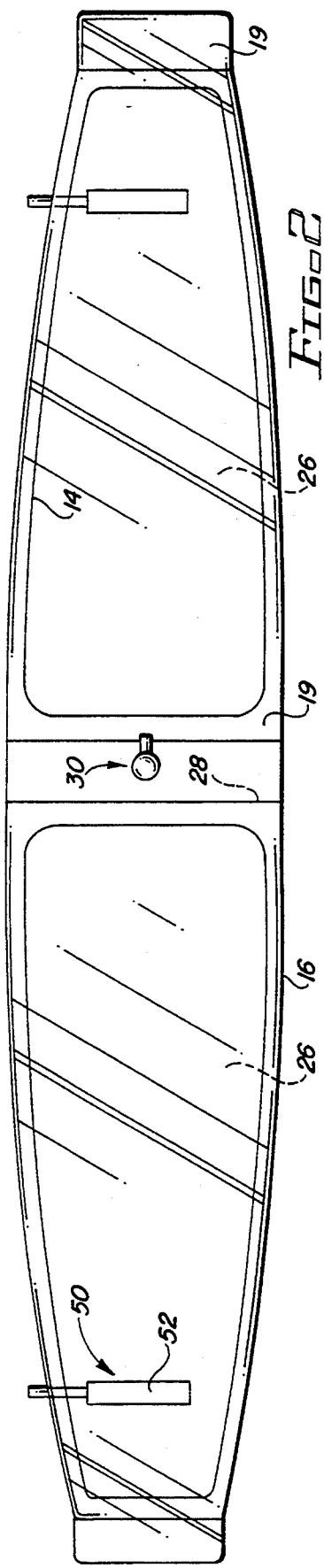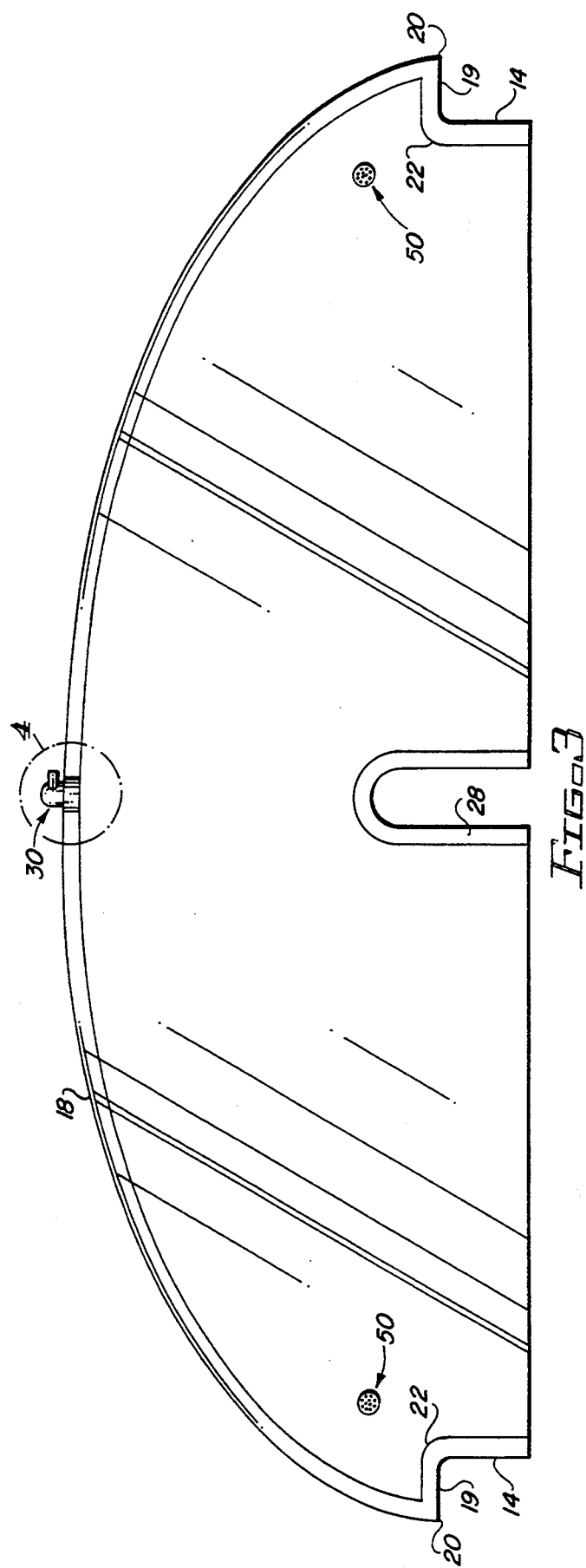

AQUARIUM EXTENSION ASSEMBLY

BACKGROUND OF THE INVENTION

1. Field of the Invention

The present invention relates to apparatus for use in combination with aquariums and more particularly to apparatus for enlarging the volume and viewing area of an existing aquarium tank.

2. Description of the Related Art

Aquariums or fish tanks are commonly available in a range of sizes from 5 gallon tanks to tanks of over 100 gallons. Typically, larger tanks are longer than smaller tanks, while the height of the various size tanks remains generally the same. Thus, as tanks are made larger, the length tends to increase proportionately greater than the height, resulting in a greater horizontal viewing area rather than a greater vertical viewing area.

Inevitably, aquarium hobbyists start with a smaller tank and subsequently find the need or desire to upgrade to a larger tank. Some aquarium enthusiasts may go through several stages of upgrading, each time requiring a breakdown of the existing assembly and setting up of a new, larger aquarium.

While there presently exists no means to "expand" an aquarium tank, there have been various devices and systems developed to enhance the construction of an existing fish tank. One such system of particular interest is disclosed in the patent to Hand, U.S. Pat. No. 5,067,439 directed to a system to facilitate filling and operation of a crossover bridge for attachment to the top of aquarium tanks, wherein a pump is combined with a plurality of end sealing devices on the bridge and a closable aperture in a vacuum portion thereof, to simplify the filling procedure.

Other bridge assemblies are disclosed in the patents to Gibson, Jr., U.S. Pat. No. 3,991,715; Bringman, U.S. Pat. No. 1,943,417; Rice, U.S. Pat. No. 2,512,678; and Polzin, U.S. Pat. No. 1,576,462. While the bridge structures disclosed in these above-referenced patents provide a system for allowing fish to swim upwardly from an aquarium and possibly into an adjacent aquarium tank, they do not effectively enlarge or "expand" the existing tank to yield a larger aquarium. Furthermore, there is no teaching in the related art of a means to maintain a stabilized negative pressure in an upper attached assembly so that the water contained therein will not fall or be released into the lower, preexisting aquarium tank, possibly overflowing therefrom. Due to the fact that most aquariums require an aeration system, to replenish oxygen in the water, it is inevitable that air will rise into a bridge or other vertical highrise structure, eliminating the vacuum that is necessary to hold the water in the structure.

SUMMARY OF THE INVENTION

The present invention is directed to an apparatus for vertically extending an existing aquarium tank and includes an extension tank having side walls, a top wall and an open bottom surrounded by a downwardly extending lip. The extension tank is specially structured to be supported on the top of the existing aquarium tank such that the downwardly extending lip and open bottom are disposed within an upper portion of the aquarium tank interior.

A circulation assembly controls a vacuum in the upper extension tank and includes an exhaust valve assembly in the top wall to permit air to be removed therefrom by an externally connected vacuum chamber and pump. The circulation assembly further includes an aeration system including a flow valve operable between an open position to permit air to enter the extension tank from the atmosphere and a closed position to prevent air from entering the extension tank. In the closed position, air is continually removed through the exhaust valve assembly without new air being replenished, resulting in an increase in the vacuum created in the extension tank. As the vacuum increases, water is drawn up from the lower aquarium tank through the open bottom of the extension tank. Operation of the flow valve between the open and closed position is responsive to a change in water level in the lower aquarium tank. As the water level rises to a predetermined level in the aquarium tank, during filling thereof, the flow valve closes, thereby causing water to be drawn upwardly into the extension tank as the vacuum therein increases. Accordingly, filling of the upper extension tank is accomplished by slowly adding water to the lower aquarium tank to maintain the water level therein at a height sufficient to maintain the flow valve in the closed position so that the water can be continually drawn up into the extension tank. If the water level in the lower aquarium tank drops, as a result of water being drawn up into the extension tank, without additional water added to the aquarium tank the flow valve opens allowing air to enter the extension tank through the aeration assembly. With the flow valve in the open position, water in the upper extension tank is maintained therein without additional water being drawn from the lower aquarium tank.

With the forgoing in mind it is a primary object of the present invention to provide an apparatus for use in combination with an existing aquarium tank for upgrading the aquarium tank and enlarging the overall volume thereof, while increasing the overall viewing area by 100% of more.

It is a further object of present invention to provide an apparatus for expanding an existing aquarium tank without having to disassemble the existing tank and set up a new, larger tank.

It is still another object of the present invention to provide an apparatus for expanding an existing aquarium tank and being specifically structured to provide easy access within the combined, expanded tank, once assembled, so as to facilitate ease of cleaning and maintenance, while further providing easy access for aquarium life throughout the entire volume of the expanded assembly.

It is still a further object of the present invention to provide an apparatus for enlarging an existing aquarium tank and including a light system being specifically structured to eliminate the entire enlarged aquarium assembly.

It is yet a further object of the present invention to provide an apparatus for vertically expanding an existing aquarium tank, which is specifically structured to be filled with water after assembly by simply pouring water into the existing aquarium tank.

These and other objects and advantages of the present invention will be more readily in the following detailed description.

BRIEF DESCRIPTION OF THE DRAWINGS

For a fuller understanding of the nature of the present invention reference should be had to the following detail description taken in connection with the accompanying drawings in which:

FIG. 1 is a front plan view of the extension tank of the present invention shown in use in combination with an existing aquarium tank;

FIG. 2 is a top plan view of the extension tank of the present invention;

FIG. 3 is a front elevation of the extension tank;

Like reference numerals are refer to like parts throughout the several views of the drawings.

DETAILED DESCRIPTION OF THE PREFERRED EMBODIMENTS

Figure 4:
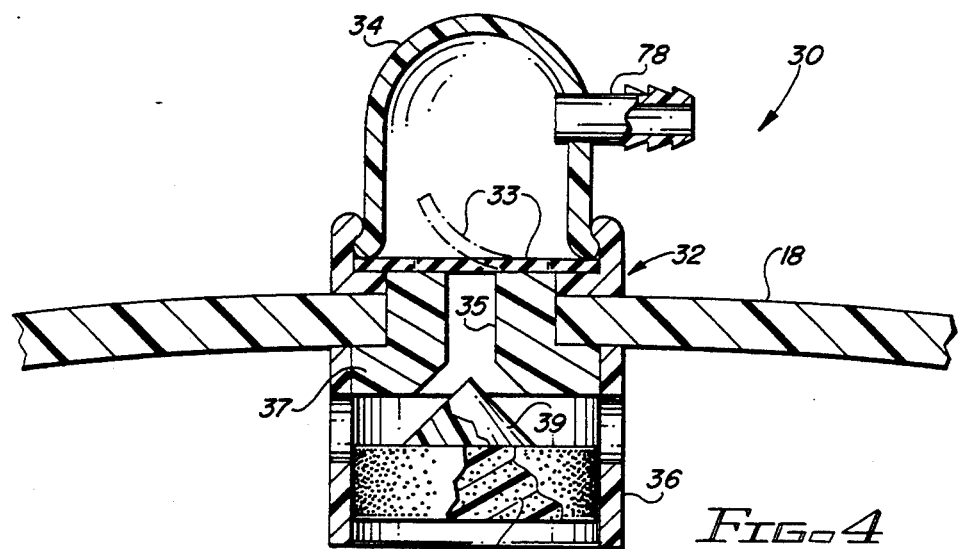
FIG. 4 is an isolated view, in partial section, taken from the area indicated as 4 in FIG. 3, illustrating an exhaust assembly on the extension tank.

Referring initially to FIG. 1, there is illustrated generally the apparatus 10 of the present invention including an extension tank 12 shown supported on an upper peripheral surrounding rim 102 of an aquarium tank 100 such that a downwardly extending lip 14 extends down through an open top of the tank 100 and into an interior thereof, below a normally full water level 104.

The extension tank 12 is preferably made of a clear $\frac{1}{4}''$ thick plexi-glass or an equivalent material. The extension tank 12 is shaped and configured to provide a modern, contemporary appearance which compliments the existing aquarium tank 100. As seen in FIGS. 2 and 3, the extension tank includes a front wall 16, a rear wall 17 and a top curved wall 18. A shoulder 19 surrounds a lower mid portion of the extension tank 12 between a bottom distal edge 20 of the top wall 18 and upper edge 22 of the downwardly extending lip 14. The shoulder 19 is specifically structured for resting support on the upper rim 102 of the aquarium tank 100. The extension tank 12 is further provided with an open bottom 26 defining an entrance area through which water is drawn from the lower aquarium tank 100 into an interior chamber thereof. The entrance area further allows fish to swim freely between the lower aquarium tank 100 and the upper extension tank 12 once the entire assembly has been filled with water. The bottom of the extension tank 12 is further provided with a bridge 28 which is designed to span over a center support normally used on an existing aquarium tank 100. The large open bottom entrance area 26 creates easy access for aquarium life and also provides for ease of maintenance, enabling the aquarium owner to reach up into the interior chamber of the extension tank 12 when supported on the aquarium tank 100 in order to rearrange objects therein and perform any necessary cleaning.

The downwardly extending lip 14 of the extension tank 12 remains constantly submerged below the water level 104 during use, while maintaining a negative pressure or vacuum in the interior chamber of the upper extension tank 12. A sufficient gap is provided between the downwardly extending lip 14 and the side walls 106 of the aquarium tank 100 so that fish can easily swim around the lip 14, as best seen in FIG. 1.

Referring to FIG. 4, there is illustrated an exhaust assembly 30 which attaches to the highest point of the top wall 18, as seen in FIG. 3. The exhaust assembly 30 includes an outer shell 32 including an upper half 34 attachable to the exterior of the extension tank 12 on the top wall 18, and a lower half 36 fitted to an under side of the top wall 18 within the interior chamber of the extension tank 12. The exhaust assembly 30 is specifically structured to allow air to be pulled out of the interior chamber of the extension tank 12 in order to create a vacuum therein or to maintain negative pressure as fresh air is replenished through an aeration valve assembly 40, (described more fully hereinafter). The exhaust assembly 30 includes a first one way air valve 33 in the shape of a diaphragm and disposed in overlying relation to an aperture 35 extending through a seal plug 37 fitted through an opening of the top wall 18 and defining a valve seat at it's opposite ends. The upper half 34 of the outer shell 32 attaches to a protruding end of the seal plug 37, while the lower half 36 fits to the bottom end of the seal plug 37 within the interior chamber, below the top wall 18. The one way diaphragm valve 33 is specifically designed to permit air to be drawn from within the chamber, while preventing air from reentering the interior chamber of the extension tank 12, thereby maintaining a negative pressure within the extension tank 12 and preventing water contained therein from being released down into the lower aquarium tank 100.

The exhaust assembly 30 further includes a float valve member 38 movably fitted within the lower half 36 and having a seal member 39 on an upper side thereof. As the water level in the interior chamber of the extension tank 12 rises to the top, the float valve 38 is forced upwardly so that the seal member 39 engages within the aperture 35 of the plug 37, thereby blocking the aperture 35 and preventing water from being drawn therethrough in response to a vacuum force created by an interconnected vacuum chamber and pump.

Figure 5:
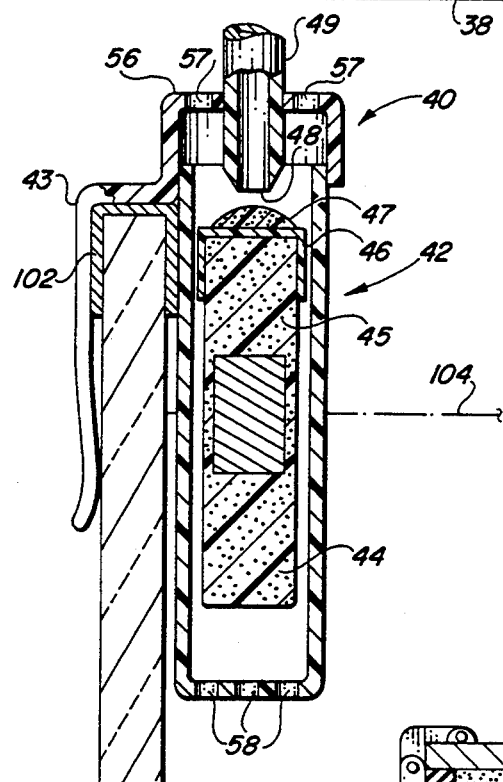
FIG. 5 is an isolated view, in partial section, illustrating an aeration assembly of the present invention.
Figure 6:
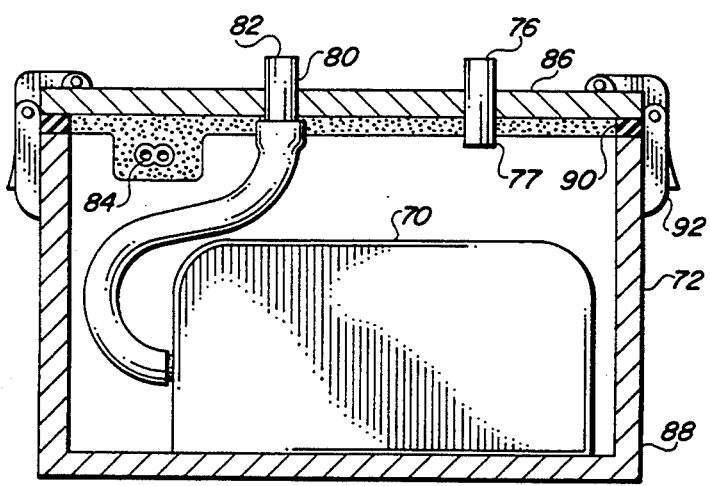
FIG. 6 is a front elevation, in partial section, illustrating a pump box and air pump of the present invention.

Referring to FIG. 5, there is generally illustrated an aeration valve assembly 40 for controlling air flow to the interior chamber of the extension tank 12, maintaining a desired pressure therein, and preventing the water level 104 in the aquarium tank 100 from falling below the downwardly extending lip 14 and open bottom 26. The aeration assembly 40 includes a generally elongate tubular housing 42 which is supported on an inner side of the aquarium tank 100 by a clip 43 which extends over the upper peripheral rim 102, maintaining the tubular housing 42 in a generally upright position such that a lower portion thereof extends below the water level 104. A float 44 contained within the hollow interior of the housing 42 is movable between a lowered open valve position and a raised, closed valve position in response to a change in the height of the water level 104. The float includes a resilient cap 46 on an upper end 45 thereof including a pillow 47 structured to engage a lower distal end 48 of an air supply hose 49 upon upward movement of the float 44 in response to the rise in the water level 104. An opposite end of the air supply hose 49 connects to one or more aerators 50 fitted through the rear wall 17 of the extension tank 12 so that an aerator head 52 is disposed within the interior chamber. The aerator head 52 includes a plurality of small apertures or pinholes designed to release air therefrom in such a matter as to create a decorative bubble action, as fresh air is replenished through the aeration valve assembly 40 to the interior chamber of the extension tank 12. The housing 42 of the aeration assembly 40 further includes a top 56 having a plurality of holes 57 there through to permit air to enter into the interior of the housing 42 from atmosphere, and holes 58 in the bottom to allow water to enter the housing in order to move the float 44. Accordingly, as the water level 104 drops, the float 44 moves to the lowered, open valve position wherein the pillow 47 disengages the lower distal end 48 of the air supply hose 49, thereby permitting air to drawn through the air hose and dispersed from the aerator heads 52 within the extension tank 12. Air is drawn through the aeration assembly 40 due to the vacuum or negative pressure maintained within the interior chamber of the tank 12.

The negative pressure or vacuum is created by an air pump 70 contained in an air tight box 72, wherein a vacuum chamber 74 is created within the box 72 as the pump 70 operates. An air supply tube 76 includes a lower end 77 disposed within the vacuum chamber 74 and an opposite end 78 which extends within the upper half 34 of the exhaust assembly housing 32. A second air hose 80 includes a first end 82 disposed exterior of the box 72 and an opposite end connected to the outlet of the pump 70 such that as the air pump 70 operates, air within the interior vacuum chamber 74 is pumped out through the air hose 80 to atmosphere creating a vacuum within the box 72 and causing air to be drawn through the exhaust valve assembly 30 from within the interior chamber of the extension tank 12. A sealed pass-through 84 is provided between a lid 86 and body 88 of the box 72 so that an electric power cord extending from the air pump can be directed to a power supply source without loosing the air tight integrity of the vacuum chamber 74. A seal 90 is provided between the lid 86 and body 88 of the box 72 and clamp members 92 facilitate air tight, sealed attachment of the lid 86 to the body 88.

Referring to FIG. 1, there is further shown a light assembly 94 including a cover 95 which is formed and configured to overlie the top wall 18. The light assembly 94 further includes a plurality of lamps (not shown for the purposes of clarity) disposed on an underside of the cover 95 in spaced relation above the top wall 18. The light cover 95 is specifically shaped and configured to conform with the over all configuration of the top wall 18, maintaining the desired contemporary appearance. The light assembly 94 is structured to direct light through the entire combined aquarium assembly, including the upper extension tank 12 and lower aquarium tank 100, thereby affectively replacing the conventional light system used on existing aquarium tanks.

The filling procedure and operating mode of the apparatus is as follows:
1. Support the upper extension tank 12 on the surrounding upper peripheral rim 102 of the existing lower aquarium tank 100 such that the downwardly extending lip 14 extends into the interior of the aquarium tank 100.
2. Fill the lower aquarium tank 100 till the water level reaches a height above the open bottom of the upper extension tank 12, at a sufficient height to close the aeration valve assembly.
3. Activate the air pump so as to draw the air from the interior chamber of the extension tank 12, creating a vacuum therein. (At this point, the water level is at a height so as to maintain the aeration valve assembly in the closed position, preventing new air from entering the interior chamber of the upper extension tank).
4. Continually add water to the lower aquarium tank 100 as the vacuum in the upper extension tank causes water to be drawn up through the open bottom.
5. When the water level is close to the desired height in the upper extension tank, discontinue adding water to the lower aquarium tank.
6. Water in the lower aquarium tank 100 will continue to be drawn to the upper extension tank 12 until the water level in the lower aquarium tank-drops a sufficient amount to open the aeration valve assembly. At this point, the negative air pressure in the upper extension tank 12 is stabilized as new air enters the interior chamber at the same rate as air being drawn through the exhaust assembly, thereby maintaining the water in the upper extension tank 12, preventing it from being released down into the lower aquarium tank 100.

Now that the invention has been described,
What is claimed is:

1. An apparatus for use with an aquarium tank of the type including a floor and vertical side walls terminating at upper peripheral edges in surrounding relation to an open top thereof, said apparatus comprising:
   an extension tank including a plurality of side walls, a top wall, an open bottom, an interior chamber and a shoulder between said top wall and said open bottom, said shoulder being structured and disposed for mating, supported engagement on the aquarium tank,
   an exhaust valve assembly in said top wall of said extension tank and including:
      a one way air valve structured and disposed to allow air to be drawn out from within said interior chamber while preventing air from entering said interior chamber from an exterior thereof,
      a float valve including a buoyant valve member movable within said assembly in response to a change in water level therein within a predetermined range, and
      a valve seat having an aperture extending therethrough in fluid communication with said one way air valve, said buoyant valve member being structured and disposed for mating engagement with said valve seat in blocking relation to said aperture upon the water level reaching a predetermined height below said aperture, thereby preventing air from being drawn out through said one way valve from within said interior chamber,
   a vacuum chamber interconnected to said exhaust valve assembly for drawing air from said interior chamber of said extension tanks,
   an air pump for maintaining a vacuum in said vacuum chamber,
   an aeration assembly for replenishing air into said interior chamber of said extension tank and including:
      an aeration flow valve including a hollow housing having a top and a bottom and a plurality of openings through said top and said bottom, and a float contained therein being movable between a lowered open valve position and a raised closed valve position in response to a change in a level of water in the aquarium tank through a predetermined range, said float including a cap on an upper end defining a seal,
      at least one aerator fitted to said extension tank and extending within said interior chamber and being structured to disperse a flow of air therein, and
      a flexible conduit including a first end connected to said at least one aerator and an opposite end disposed within said housing of said flow valve permitting air to be drawn therethrough for delivery to said at least one aerator when said float is in said lowered open valve position, said opposite end of said flexible conduit being positioned and disposed for mating, sealing engagement with said cap on said float upon maximum upward movement thereof to said closed valve position, thereby preventing air flow through said flexible conduit to said at least one aerator.

2. An apparatus as recited in claim 1 wherein said extension tank includes a lip extending downwardly from said shoulder to said open bottom, said lip being structured and disposed to extend downwardly into the aquarium tank so as to position said open bottom at a level below the upper peripheral edge of said aquarium tank.

3. An apparatus as recited in claim 1 further including a light assembly having a cover structured and disposed for supported engagement with said top wall in covering relation thereto and including at least one lamp on an underside thereof for directing light through said top wall and into said interior chamber of said extension tank and throughout the aquarium tank.

4. An apparatus for use with an aquarium tank of the type including an interior, a floor and vertical side walls extending upwardly from the floor and terminating at upper peripheral edges in surrounding relation to an open top thereof, said apparatus comprising:
  an extension tank including a plurality of side walls, a top wall, an open bottom and an interior chamber,
  means on said extension tank for supporting engagement with the aquarium tank such that said open bottom is disposed within the aquarium tank at a level below the upper peripheral edges,
  exhaust valve means on said extension tank structured and disposed for one way passage of air therethrough in response to an external vacuum force causing air to be drawn from within said interior chamber,
  vacuum means for creating the vacuum force to draw air from within said interior chamber at a predetermined exhaust rate,
  aeration means for replenishing air into said interior chamber at a replenishing rate equal to said predetermined exhaust rate, said aeration means being operable between an open condition, permitting air to enter said interior chamber, and a closed condition, preventing air from entering said interior chamber, operation thereof between said open and closed positions being responsive to a change in water level in said aquarium tank within a predetermined range,
  said aeration means including an aeration assembly including a flow valve having means for support on the aquarium tank and extending at least partially within the interior thereof below the upper peripheral edges, said flow valve including a hollow housing having a top end and a bottom end and a plurality of openings through said top end and said bottom end, and a float contained therein being movable between said open condition and said closed condition, and
  said float including a cap on an upper end defining a seal, said cap being specifically structured and disposed for mating sealing engagement with a lower distal end of an air hose connecting between said flow valve and said interior chamber of said extension tank.

5. An apparatus as recited in claim 4 wherein said exhaust valve means includes a one-way air valve structured and disposed to allow air to be drawn out from within said interior chamber while preventing air from entering said interior chamber from an exterior thereof.

6. An apparatus as recited in claim 5 wherein said exhaust valve means further includes a float valve including a buoyant valve member movable between an open position and a closed position in response to a rise in water level within said interior chamber of said extension tank, said float valve being specifically structured to prevent water from being drawn out through said exhaust valve means.

7. An apparatus as recited in claim 4 wherein said vacuum means includes an air pump contained within an air-tight sealed box and being operable to define a vacuum chamber within said sealed box.

* * * * *